United States Patent [19]

Columbus

[11] 4,057,527

[45] Nov. 8, 1977

[54] AQUEOUS ACRYLATE CONTACT ADHESIVE DISPERSIONS

[75] Inventor: Peter Spiros Columbus, Whitestone, N.Y.

[73] Assignee: Borden, Inc., Columbus, Ohio

[21] Appl. No.: 686,469

[22] Filed: May 14, 1976

Related U.S. Application Data

[63] Continuation of Ser. No. 475,222, June 17, 1974, abandoned.

[51] Int. Cl.$^2$ ............................................. C08L 33/02
[52] U.S. Cl. ................... 260/29.6 WB; 260/29.6 TA; 260/27 R
[58] Field of Search .............. 260/29.6 WB, 29.6 TA, 260/27 R; 428/514

[56] References Cited

U.S. PATENT DOCUMENTS

| 3,231,533 | 1/1966 | Garrett et al. ............... 260/29.6 TA |
|-----------|--------|-------------------------------------------|
| 3,501,445 | 3/1970 | Faust et al. ...................... 260/86.1 R |
| 3,682,871 | 8/1972 | Mikofalvy et al. .......... 260/29.6 TA |
| 3,790,520 | 2/1974 | Ludwig ........................ 260/29.6 TA |
| 3,832,317 | 8/1974 | Mikofalvy et al. ......... 260/29.6 WB |
| 3,853,606 | 12/1974 | Parkinson ......................... 260/27 R |

OTHER PUBLICATIONS

Del Gatto, *Rubber World*, 1968, N.Y., p. 237.

*Primary Examiner*—M. J. Welsh
*Attorney, Agent, or Firm*—George P. Maskas; George A. Kap; Daniel D. Mast

[57] ABSTRACT

An adhesive composition which comprises for each 100 parts, by weight, of an aqueous dispersion having a pH of from about 3 to 10 of the following ingredients dispersed in 25 to 75 parts of water.

A. from 25 to 70 parts by weight of a water insoluble polymer containing the following interpolymerized monoethylenically unsaturated monomers.
 a. at least 50% by weight, based on the polymer, of acrylate monomers;
 b. from about 0.1 to 10% by weight based on the polymer, of N-methylolacrylamide, and
 c. from about 0.1 to 25% by weight, based upon the polymer, of a monoethylenically unsaturated monomer containing carboxylic acid groups
 d. from about 2 to 40% based upon the polymer of an acrylonitrile
 e. from 0 to 40% by weight based on the polymers of an addition polymerizable vinyl monomer other than those defined above
 f. from 0 to 1% by weight based on the polymer of a cross-linking agent B. a small but effective amount to thicken the acrylate composition up to 3 parts by weight of the composition of an alkali metal or ammonium salt of a polyacrylic acid C. from a small but effective amount to impart freeze-thaw stability up to 3 parts of a surface active agent D. from a small but effective amount to depress the freezing point of the dispersion up to 3 parts of a freezing point depressor E. from a small but effective amount to render the dried adhesive tacky up to 10 parts of a tackifying agent. Compositions within the scope of the present invention are useful as contact adhesives. These adhesives have the same utility as known contact cements that effect strong instant bonds on contact with a variety of substrates including plywood, hardboard, particleboard, wood, leather, floor coverings, Styrofoam, metal sheeting and plastic laminates such as Formica. The cured adhesive films formed are resistant to oil, gasoline, water, heat and discoloration or aging.

8 Claims, No Drawings

AQUEOUS ACRYLATE CONTACT ADHESIVE DISPERSIONS

This is a continuation of application Ser. No. 475,222, filed June 17, 1974, now abandoned.

BACKGROUND OF THE INVENTION

The present invention is directed to a contact adhesive useful for adhering a variety of materials to a variety of substrates. The contact adhesives of the present invention are substantially or entirely free of organic solvents since they are aqueous dispersions of polyacrylates.

Various adhesives are formulated for use as contact cements. The most useful member of the particular class of adhesives are the solvent based contact cements. The use of these cements results in the release of toxic and flammable solvents into the environment. These materials are difficult to apply and clean up, unstable in the container, subject to solvent loss and phasing out of the non-volatile content of such adhesives. These adhesives tend to crystalize and discolor at sustained temperatures above 150° to 160° F.

A second type of contact adhesive which has recently been introduced is the aqueous dispersion type contact adhesives. The aqueous dispersion type contact adhesives of the prior art however, have less than the desirable degree of bond strength, resistance to heat and oxidation, stability in containers, and freeze-thaw stability generally. Specific types of aqueous dispersion type contact adhesives cause eye irritation, have an unpleasant odor, are difficult to apply because they are too free-flowing, and are difficult to clean up after use. The prior art adhesives include neoprene and natural rubber dispersions in water.

SUMMARY OF THE INVENTION

The shortcomings of the prior art contact adhesives enumerated above have been overcome by the contact adhesives of the present invention. The contact adhesives of the present invention, as compared with the above prior art, form much stronger bonds with a wider variety of substrates and have better resistance to bond degradation from heat and oxidation, have a more pleasant odor, have better stability in the container, are easier to clean up leaving no sticky residue on surfaces or other equipment, are nonirritating to the eyes, have a thixotropic or pseudoplastic nature, which prevents the running of the adhesives on vertical surfaces and allows for packing in tubes, are freeze-thaw stable, non-toxic, nonflammable and nonsniffable. The contact adhesives of the present invention can be used to bond each of the following materials to itself or any other of the enumerated materials. The materials include wood, various forms of paneling such as plyboard, particleboard, plasterboard; acoustic tile; the various metals such as steel and aluminum; and ceramics such as bricks, blocks, etc.

The adhesives of the present invention can also be used in conjunction with foamed varieties of plastics such as polystyrene and does not dissolve the foamed plastics like a solvent based contact cement would.

DESCRIPTION OF THE PREFERRED EMBODIMENT

The adhesive composition of the present invention comprises for each 100 parts by weight of the aqueous dispersion having a pH of about 3 to 10 and preferably of from 5 to 9 of the following ingredients dispersed in 25 to 75 and preferably from 40 to 60 parts of water.

A. from 25 to 70 and preferably from 40 to 60 parts by weight of a water-insoluble binder polymer, which has units of the following structure:

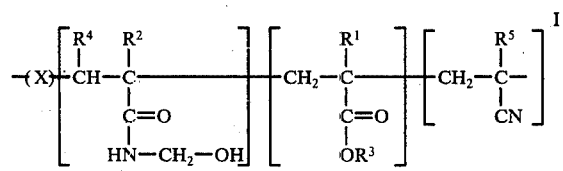

wherein $R^1$ and $R^2$ which can be the same or different are H, lower alkyl of up to about 4 carbons, such as methyl or butyl, or less preferably halogen, $—CH_2COOR^3$, $—COOR^3$, or $—CH_2COOH$; $R^3$ being lower alkyl of from 1 to 8 carbon atoms; examples being methyl, hexyl and octyl, at least a portion of $R^3$ being H to give free carboxyl groups; $R^4$ is H $—COOH$, or $—COOR^3$, wherein $R^3$ is above, $R^3$ preferably being H; whereas $R^5$ can be H or a lower alkyl of up to about 4 carbons such as methyl or butyl; and X is derived from at least one copolymerizable optional vinyl monomer (defined hereinbelow starting on page 8) other than the one or ones from which group of formula II below is derived.

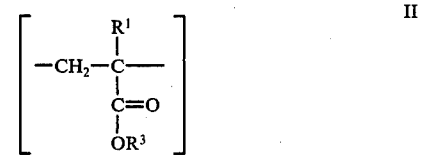

The proportion of monomers in the binder polymer are such that there is at least 50% by weight based on the binder polymer of acrylate monomers. The acrylate monomers from the polymeric units of formula II above. Examples of $R^1$ are:

| $R^1$ | Acid for Carboxyl Source when $R^3$ is H |
|---|---|
| H | Acrylic |
| $CH_3$ | Methacrylic |

The matter in the parenthetical group of Formula II, of course, represents that portion of the addition polymerized polymer backbone having free carboxyl groups carboxyl groups which are esterified by the various alcohols conventionally used.

The preferred range is from about 50% to 99% of acrylic monomer. The optimum considered to be in the range of 70% to 95%. The proportion of monoethylenically unsaturated monomer containing within the scope of Formula II or (X), is such that there is at least 0% to no more than 25% of it by weight of the monomers going into the binder polymer. A preferred range is from 0.2% to 1.0%.

A characteristic of the polymer is that there be present from a small but effective amount to cross-link the polymer when the water is removed up to 10% by weight based upon the linear polymer and preferably from 0.5 to 3% of N-methylolacrylamide units or units derived from N-methylolacrylamide and represented by the formula:

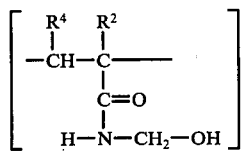

III

The preferred units are the N-methylolacrylamide units.

Another characteristic of the polymer is that there be present from about 2% to about 40% and preferably 3 to 20% of an acrylonitrile unit represented by the formula:

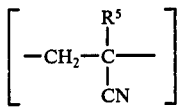

IV

Preferably the acrylonitrile containing unit is acrylonitrile or methacrylonitrile.

The optional portion-X-is derived from any of the well-known unsaturated addition polymerizable vinyl monomers, other than those which give units of Formula II. The optional portion-X-can be present at a level of up to 50% by weight of the binder polymer. In addition to the binder polymer of Formula I, the adhesive dispersion includes the following:

B. a small but effective amount to thicken the adhesives composition up to 3 parts by weight of the composition of a salt of a polyacrylic acid, a preferred range is from about 0.25 to 1.75 parts.

C. optionally from a small but effective amount to impart freeze-thaw stability up to about 3 parts of a surface active agent D. optionally from a small but effective amount to impart freeze-thaw stability up to 3 parts of a freezing point depressor.

The binder polymers are those of the addition polymer type, including as an optional component the alpha-beta unsaturated carboxylic acid, preferably acrylic acid or methacrylic acid. The carboxylic acid can be used to form (X) units or Formula II units.

To amplify, the unsaturated carboxylic acid may be a simple monocarboxylic acid, a polycarboxylic acid, or may be a partial ester of such alpha-beta unsaturated polycarboxylic acids, and salts thereof with a volatile base such as ammonia or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, are sorbic, acryloxyacetic, acryloxpropionic, cinnamic, vinyl furoic, alphachlorosorbic, methacryloxypropionic, methacryloxyacetic, p-vinylbenzoic, acrylic, methacrylic, maleic, fumaric, aconitic, atropic, crotonic, and itaconic acid, or mixtures thereof, with itaconic acid and the alpha-beta unsaturated monocarboxylic acid, particularly methacrylic acid and acrylic acid being preferred. Other copolymerizable acids monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconic, butyl acid itaconate, methyl acid fumarate, butyl acid fumarate, methyl acid maleate and butyl maleate. Such partial esters are considered to be "alpha-beta unsaturated monocarboxylic acid" and the term as used herein includes such esters.

The term "vinyl monomer" as used herein means a monomer comprising at least one of the following groups:
vinylidene $CH_2 = C<$
vinyl $CH_2 = CH-$
vinylene $-CH = CH-$
whether homopolymerizable or not, giving units corresponding to X. Examples are the alpha-beta-ethylenically unsaturated aldehydes, alpha-beta-ethylenically unsaturated dicarboxylic acids and esters, amides, and half esters thereof, alpha-beta ethylenically unsaturated nitriles, hydrocarbons such as alpha-olefins, conjugated diolefins, vinylaryl compounds, vinyl alkyl ethers, vinyl halides, vinylidene halides, vinyl sulfides and vinyl acryloxy compounds (esters of saturated carboxylic acids and ethylenically unsaturated alkanols. The vinyl polymers and the methods for their preparation are well known.

Specific examples of suitable monomers which may be copolymerized to obtain the water-insoluble polymers for use according to the invention in addition to the unsaturated acid monomers and esters thereof alkanols having 1 to 20 carbon atoms, such as methanol, ethanol, butanol, pentadecanol and the like are acrolein, methacrolein, ethylene, propylene, isobutene, butadiene, isoprene, chloroprene, styrene, vinyl-toluene, vinyl methyl ether, vinyl isobutyl ether, vinyl chloride, vinyl bromide, vinylidene chloride, vinyl sulfide, vinyl acetate and vinyl propionate. Copolymers, and graft, block, or segmented polymers are included. Conventional methods of obtaining the binder polymers are utilized.

Other materials represented by X include cross-linking agents derived from monomers such as diallyl mateate, divinylbenzene, di-vinyl ether of 1,4 butendiol, trimethylol propane triacrylate and trimethacrylate can also be present at a level of 0.01 – 1.01% and preferably .03 to 0.8% based upon the binder polymer. Diallyl maleate is the preferred cross-linking agent.

Another monomer in addition to the acid monomer, utilized in a substantial proportion to prepare the binder polymer is the monomer represented by the formula:

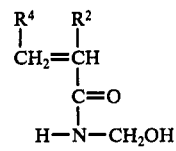

Compounds represented by the formula include, N-methylolacrylamide and N-methylolmethylacryamide. The preferred monomer is N-methylolacrylamide.

Preferred acrylonitrile co-monomers include acrylonitrile and methacronitrile. These co-monomers impart improved elastomeric properties, tensile strength and solvent resistance to the binder polymer.

Another important and at times essential monomer in addition to the acid and nitrogen containing monomers is a resiliency imparting or "soft" monomer which may be represented by the following formula:

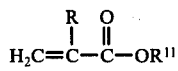

wherein R is H or alkyl having 1 to 4 carbon atoms and $R^{11}$ is the straight chain or branched chain radical of a primary or secondary alkanol, alkosyalkanol, or alkylthiaalkanol, and having up to about 14 carbon atoms, examples being ethyl, propyl, n-butyl, 2-ethylhexyl, heptyl, hexyl, octyl, propyl, 2-methybutyl, 1-methybutyl, butoxybutyl, 2-methylpentyl, methoxmethyl, ethoxyethyl, cyclohexyl, n-hexyl, isobutyl, ethylthiaethyl, methylthiaethyl, ethylthiapropyl, n-octyl, 6-methylnonyl, decyl, dodecyl and the like, said radicals $R^{11}$ when alkyl, having from 2 to about 14 carbon atoms, preferably from 3 to 12 carbon atoms, when R is H or methyl. When R is alkyl and $R^{11}$ is alkyl, $R^{11}$ should have from about 6 to about 14 carbon atoms and when R is H and $R^{11}$ is alkyl, $R^{11}$ should have from about 2 to about 12 carbon atoms, in order to qualify as soft monomer.

Other ethylenically unsaturated copolymerizable vinyl monomers, the homopolymers of which have a much higher $T_g$, are used in combinations with the above mentioned soft monomers provided they do not adversely affect the desired properties of the adhesives (e.g., unduly raise the overall $T_g$). The "hard" acrylics may be represented by the formula:

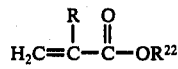

wherein R is as above. $R^{22}$ is preferably alkyl and is methyl or alkyl having from about 13 to about 20 carbon atoms when R is H, and is alkyl of from 1 to about 5 carbon atoms or alkyl of from about 15 to 20 carbon atoms when R is methyl. It can be seen from above that for alkyl acrylates and alkyl methacrylates the $T_g$ at first decreases with an increased chain length of the alkyl group and then the $T_g$ again increases; i.e., both hard and soft monomers are known to occur in each group of monomers. Examples of these hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolocrylamide.

As is known, for a given number of carbon atoms in the alcohol moiety, the extent and type of branching markedly influences the $T_g$, the straight chain products giving the lower $T_g$. The $T_g$ is directly related to the minimal-film-forming temperature of the acrylic dispersion in that at the $T_g$ point, the affinity of the dispersed polymer particles for one another is increased to the effect that they coalesce forming a continuous film.

As is apparent, an important property of the binder polymer is the $T_g$ thereof, and minimal-film-forming temperature of its dispersion. These are usually closely related both numerically and in respect to efficacy, consequently, the selection of monomers and proportions thereof for specific end uses depends upon their influence on the $T_g$ and minimal-film-forming temperature. For the present application where contact adhesive is required, the $T_g$ of the polymer should be between $-20°$ C. to $+15°$ C. $T_g$ is a conventional criterion of polymer hardness and is described by Flore, "Principles of Polymer Chemistry" pp. 56 and 57 (1953), Cornell University Press, see also pp. 51–63, Interscience (1966). While actual measurement of the $T_g$ is preferred, it may be calculated as described by Fox, Bull. Am. Physics Soc. 1, 3 p. 123 (1956). Examples of the $T_g$ of homopolymers and the inherent $T_g$ thereof which permits such calculations are as follows:

| Homopolymer of: | $T_g$ C° |
|---|---|
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| n-tetradecyl acrylate | 20 |
| t-butyl acrylate | 43 |
| methyl methacrylate | 105 |
| acrylic acid | 106 |

These or other monomers are blended to give the desired $T_g$ of the copolymer.

The minimal-film-forming temperature of the dispersions used in this invention include $-40°$ C to $+20°$ C for a broad range and $-20°$ C to $+15°$ C for the preferred range. The polymeric binder containing the above described N-methylolacrylamide moiety and free carboxyl group is desirably obtained by including in the polymerization one or more of the ethylenically unsaturated acids with other unsaturated monomers including among the more preferred vinyl monomers, the esters of acrylic acid of methacrylic acid with benzyl alcohol, phenol or a saturated monohydric aliphatic alcohol, especially an alkanol, having 1 to 18 carbon atoms, such as: cyclopentanol, cyclohexanol, methanol, ethanol, n-propanol, isopropanol, n-butanol, methoxyethanol, ethoxyethanol, methoxyethoxy ethanol, ethoxyethoxyethanol, isobutanol, sec-butanol, tert-butanol, and of the pentanols, hexanols, octanols, decanols, dodecanols, hexadecanols, and octadecanols, bearing in mind the required Tg. Other preferred co-monomers include vinyl acetate, styrene, vinyl-toluene (o,m,p), vinyl chloride or vinylidene chloride.

Particularly preferred are polymers containing the above described N-methylolacrylamide of an ester of acrylic acid and an alkanol having 1 to 4 carbon atoms, copolymerized with methacrylonitrile of acrylonitrile, with methacrylic acid or acrylic acid being copolymerized in smaller amounts. Blends of copolymers may be used.

High molecular weight polymer, e.g., 10,000 to several million obtained by emulsion polymerization or other methods and of water-insoluble character when in acid form, are used as the binder polymer. Preferably, the binder polymer has a molecular weight of 10,000 to 600,000 or more.

The substrates with which the invention is concerned include all material such as fiber glass textiles, asbestos sheets, asbestos cement products, concrete, stone, stucco, slate, sandstone, granite, ceramics, and porcelain; fiber reinforced plastic articles such as canoes, boat hulls, or other formed articles made out of fiber glass reinforced polyesters or other plastic materials; metals such as aluminum, steel, iron, brass; wood and other structural materials; metal oxide layers such as those of aluminum oxide and iron oxide; leather textiles of cellulose such as cotton, linen, silk wool, rayon, cellulose esters such as cellulose acetate, nylons, polyesters such as polyethylene glycol terephthalate, acrylonitrile polymers, vinylidene chloride polymers and other vinyl or acrylic ester polymers; films, pellicles, sheets and other shaped articles of various plastic systems such as of cellulose ethers or esters including hydroxyethyl cellulose ethers or esters including hydroxyethyl cellulose, methyl cellulose, cellulose acetate, cellulose acetate butyrate, polyesters such as polyethylene glycol terephthalate, nylons, vinyl chloride or vinylidene chloride polymers and copolymers, methyl methacrylate polymers and co-polymers, aminoplast or phenoplast resin, organopolysiloxane resins or rubber.

The adhesives of the present invention are formulated to provide good freeze-thaw stability, toughness in the final film, and are thixotropic or pseudoplastic adhesives which can be applied to vertical surfaces. These three properties are accomplished by the incorporation of a salt of a polyacrylic acid into the adhesive composition. The term polyacrylic acid is used in its broad sense and includes derivatives. The salts of the polyacrylic acids are water-soluble salts of copolymers containing 30% to 90% by weight of acrylic or methacrylic acid with an alcohol of one to eight carbon atoms, at least 90% by weight of the ester being derived from one or more alcohols having one to three carbon atoms. The copolymer has a molecular weight of at least 100,000 and preferably of at least 500,000 being neutralized with ammonium hydroxide or a hydroxide of an alkali metal such as sodium, potassium or lithium or a lower amine such as methylamine, trimethylamine, or triethanolamine. Examples of the acrylic esters are those of methanol, ethanol, propanol, isopropanol, n-butanol, sec-butanol, tert-butanol, pentanols, hexanols, cyclohexanols and octanols.

The carboxylic acid, and the salts of the polyacrylic acids, can be made by the hydrolysis of esters, or nitriles of acrylic acid or they can be made by the polymerization of acrylic acid including methacrylic acid, and an ester of acrylic acid with an alcohol of one to eight carbon atoms. The method of making these compositions and the compositions themselves are well-known and are described for example in U.S. Pat. No. 2,275,991 of Powers, 1942; U.S. Pat. No. 3,035,004 of Glavis, 1962; and U.S. Pat. No. 3,501,445 of Foust, 1970. The Foust patent also includes other monomers in polyacrylic acid salt polymer which results in the cross-linking of the polymer.

The salt of the polyacrylic acid is present in a small but effective amount to thicken the adhesive acrylic compound composition up to 3 parts by weight of the composition. Preferably the salt of the polyacrylic acid is present at a level of from 0.1 to 1.0 parts based on 100 parts of the aqueous acrylate adhesive dispersion (or composition). Parts of following components are also based upon 100 parts of composition.

A small but effective amount to impart freeze-thaw stability up to 3 parts and preferably from 0.1 to 2.0 parts of a surface active agent is also preferably present in the adhesive dispersion. The surface active agent may be anionic or nonionic or a mixture of both types. The surface active agent may be the same or of the same type that is used in the emulsion polymerization of the polyacrylic acid or of the polymerization of the binder polymer. Examples of anionic emulsifying agents that can be used include the following sulfates such as sodium lauryl sulfate, the alkylaryl sulfonates, such as the sodium salt of t-octylphenyl sulfonate, the sodium dioctyl sulfosuccinates and so on. Examples of the nonionic dispersing agents that may be used for preparing the monomeric emulsions before copolymerization or dispersions of the polymer after polymerization include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxpolyethoxyethanols, nonylphenoxypolyethoxyethanols, dodecylphenoxpolyethoxyethanols, and the like, polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 6 to 60 oxyethylene unity per molecule; analogous ethylene oxide condensates of long-chained alcohols, such as octyl, decyl, lauryl, or cetyl alcohols, ethylene oxide derivatives of etherified or esterified polyhydroxy compounds having hydrophobic hydrocarbon propylene oxide section combined with one or more hydrophilic ethylene oxide sections. The presence of the surface active agents is optional though preferred.

Another optional though preferred ingredient is a small but effective amount to depress the freezing point up to 3 parts of a freezing point depressor. The function of the freezing point depressor is to prevent the aqueous acrylate adhesive dispersion from freezing and thus stabilizing it. A secondary function of the freezing point depressor is to aid in the coalescence of the acrylate dispersion on setting to form an adhesive film. The freezing point depressor may be selected from the group of lower glycols and polyols having up to 6 carbon atoms. Examples are ethylene glycol, propylene glycol, glycerin, butylenetriol, pentalene glycol, and pentaerythritol. The preferred freezing point depressor is propylene glycol, and it is selected because it is relatively nontoxic and relatively volatile. The volatility of the propylene glycol allows the propylene glycol to remain with the acrylate just long enough to aid in the coalescence during the setting of the adhesive film and then evaporate so that water resistance of the final bond is not effected. From 0.5 to 2 parts of the freezing point depressor are preferably present.

Another preferred though not essential ingredient in the composition is a tackifying resin. The tackifying resin is present at a level of from .5 to 5 parts. The preferred tackifying resin is a polyhydric alcohol ester of rosin. Polyhydric alcohols which can be used in the esterification include: trimethylene glycol, tetramethylene glycol, etc.; monoethylene glycol, diethylene glycol, triethylene glycol, tetramethylene glycol, hexaethylene glycol, etc.; monopropylene glycol, dipropylene glycol, tripropylene glycol, etc.; butylene glycol, dibutylene glycol, tributylene glycol etc. The glycerides and polyethylene glycols are preferred as providing maximum combined softening and adhesive properties.

The rosin acid group of the ester used may be that of any wood or gum rosin acid. Preferably the gum rosin acid has been treated in such a way as to reduce its oxygen absorption tendencies or rosin acids are reduced by treating them in such a way as to reduce their apparent unsaturation. Rosin acids which have had their apparent unsaturation reduced and therefore may be used in preparing glycol esters used in accordance with this invention are rosin acids which have been completely or partially hydrogenated by any of the methods wellknown to the art; or those rosin acids which have been dehydrogenated and are characterized by an appreciable proportion of dehydrogenated rosin acid groups; or those rosin acids which have been subjected to a disproportionation treatment of a "Hyex" (described in Littmann U.S. Pat. No. 2,154,629) such as those well-known to the art. It will be appreciated the rosin acid may be in the form of an ordinary rosin or in the form of a more concentrated rosin acid extracted therefrom, i.e., abietic acid, pimaric acid, etc. Both hydrogenated rosin and dehydrogenated rosin are of a molecular configuration characterized by greatly decreased apparent unsaturation and decreased oxygen absorption values. Treatments reducing the apparent unsaturation of the rosin acid group may be applied to the glycol esters of the rosin acid. The treated rosin, rosin acid, or ester thereof is characterized by a thiocyanate number below 60, usually below 30, as compared with 90-100 for rosin; and an oxygen absorption of less than 2% when subjected to oxygen at 300 pounds per square inch pressure for 162 hours at 25° C. as compared with oxygen absorptions of 4-8% for ester gum and 8-9% rosin.

It is helpful, in some cases to utilize a silane to improve wet adhesion to glass by the adhesive and also, at times, to utilize plasticizers for improving low temperature flexibility, for example, at −15° F. Suitable silanes include vinyltriethoxysilane, δ-methacryloxpropyltrimethoxysilane, δ-mercaptopropyltrimethoxysilane, δ-glycidoxpropyltrimethoxysilane, β-(2,4-epoxycylohexyl)ethyltrimethoxysilane, δ-aminopropyltrietoxsilane, and N-(dimethoxymethylsilylisobutyl)ethylenediamine. The silane concentration may be between about 0.05 parts and 0.5 parts. Higher amounts may be used, but do not result in proportional improvements in adhesion. Suitable plasticizers include oil-modified sebacic acid alkyds, unmodified sebacic acid alkyds, oil-modified maleic polyesters, etc. It is preferred to use "internal" plasticization by means of soft monomers in the binder polymer.

The binder polymers of Formula I can be produced by polymerization of the recited monomers by an emulsion technique in which the monomers other than the N-methylolacrylamide, are emulsified by non-ionic or anionic emulsifiers or suitable mixtures thereof, and the N-methylolacrylamide is added slowly during the polymerization. When persulfates are used as initiators, stable latices may be obtained even without including an emulsifier initially in the polymerization system. The emulsifiers are retained in the final dispersion to provide stability. The polymerization may be effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5 to 1% of the initiator. Examples of organic peroxide catalysts that may be used include benzoyl peroxide, acetyl peroxide, caproyl peroxide, butyl perbenzoate and butyl hydroperoxide. Examples of azo catalysts include azodiisobutyronitrile, azodiisobutyramide, dimethyl or diethyl or dibutyl azodiisobutyrate, azobis (alphagamma-dimethylvaleronitrile), azobis (alpha-methylbutyronitrile), azobis (alpha-methylvaleronitrile), dimethyl or diethyl azobismethylvalerate and the like.

A redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as alkali metal sulfite, bisulfite or metabisulfite, of hydrosulfite of hydrazine. The action of the redox system may be controlled through use of a chain transfer agent or regulator such as mercaptoethanol or other mercaptan. Such regulators also find use outside of redox systems with organic or inorganic peroxides and with azo catalysts, such as azodiisobutyrate. Examples of suitable non-ionic emulsifiers include the higher alkyl phenoxypolyethoxyethanols in which alkyl in the group has from 6 to 18 carbon atoms, such as octyl, dodecyl or octadecyl and there may be from 8 to 50 more oxyethylene units. Examples of anionic emulsifiers include the higher fatty alcohol sulfates, such as sodium lauryl sulfate. To reduce monomer odor, it is preferable to use higher amounts of catalyst and/or steam distill monomer from product and/or blow the monomer from the product using inert gas.

The procedure for formulating the adhesive is quite straight forward. The formulating procedure involves first adding a small quantity of aqueous dispersion of the binder polymer to a mixing tank. The suspending agent is then slowly added to produce a uniform mixture. The remainder of the aqueous binder polymer dispersion is then added with mixing.

To assist those skilled in the art to practice the present invention, the following modes of operation are suggested by way of illustration, parts and percentages being by weight and the temperature in C° . unless otherwise specifically noted.

EXAMPLE I

To a clean stainless steel reactor with agitation is added 454.7 parts of water, 8.9 parts of Triton X-165 which is an octylphenoxypolyethoxyethanol containing 16 ethoxy units and 8.9 parts of Triton X-305 which is an octylphenoxypolyethoxyethanol containing 30 ethoxy units, dissolved in 1.4 parts of water. The mixture is then heated to 55° C. and held at that temperature for 30 minutes. An additional 227.4 parts of water is then added and the mixture is cooled to 35° C.

An acrylate monomer mixture is made up by mixing 744.7 parts of ethylacrylate; 47.5 parts of acrylonitrile; 5.9 parts of methylacrylic acid; 26.8 parts of Triton X-165 and 26.8 parts of Triton X-305. A second feed containing 19.8 parts of N-methylolacrylamide and 57.4 parts of water is also prepared. A sodium bisulfite solution is also prepared by mixing 5.5 parts of sodium bisulfite and 49.9 parts of water. This is to be used as part of a redox catalyst. The other part of the redox catalyst is made by dissolving 4.2 parts of ammonium persulfate in 103 parts of water. The reactor is subjected to a nitrogen purge with the batch held at 34° C. To the reactor is then charged 11.1 parts of the sodium bisulfite solution and 21.4 parts of the ammonium persulfate solution. The purge is stopped and the stainless steel tank is blanketed with nitrogen. A small portion, 87.7 parts of the acrylate monomer, mixture 11.1 parts of the sodium bisulfite solution and 21.4 parts of the ammonium persulfate solution are added to the tank and polymerized. The the acrylate monomer, the N-methylolacrylamide solution and the sodium bisulfite solution are fed to the tank at a uniform rate over a three-hour period with the exception that the N-methylolacrylamide feed is delayed for 10 minutes after the monomer feed is started and is finished 20 minutes before the monomer feed is finished.

The product is an aqueous dispersion containing 49% solids of a binder polymer within the scope of Formula I. The binder polymer contains units derived from ethylacrylate, acrylonitrile, methacrylic acid and N-methylolacrylamide.

A contact adhesive is made from the dispersion of the binder polymer by the following procedure. To a stainless steel tank with an agitator in operation, is added 92.42 parts of the above dispersion; 0.97 parts of Acrysol ASE-60 (Acrysol ASE-60 is available from Rohm & Haas and is a partially hydrolyzed polyethylacrylate dispersion in water. Approximately 60% of the acrylate groups are hydrolyzed to acrylic acid groups), 4.75 parts of Nopco 2271 (Nopco 2271 is an aqueous dispersion of the glyceride ester of rosin. The properties of this dispersion include the following: 1-2 micron particle size, 2500 cps viscosity, anionic, 46% solids, 88° C. M P, 8.5 #/gal 8.7 pH (2% emulsion), and 0.49 parts of Triton X-405 (Triton X-405 is a water solution of 70 % octylphenoxypolyethoxyethanol with 40 ethoxy units per molecule, containing 30% water with a pour point of 25° F., a viscosity at 25° C. of 490 cps and a weight per gallon of 9.2 pounds per gallon. After the addition of the ingredients, the mixture is agitated for an additional 20 minutes then 0.10 parts of 26 Be ' ammonium hydroxide are added to achieve a pH of 8.2 to 8.5. The agitation is continued for 20 minutes. The pH is then rechecked and adjusted to a pH of 8.2 to 8.5 if necessary then 0.97 parts of propylene glycol is added slowly with agitation then the agitation is continued for 15 minutes. The Brookfield viscosity using a number 4 spindle at 50 rpm and 25° C. should be 2,000 to 2,500 cps. If the viscosity is too high, water should be added. The pH should be 8.2 to 8.5 when manufactured and the product should contain 50 ± 1.5% solids. The product is filtered through a 100 mesh stainless steel screen into polyethylene lined fiber drums. The product is packaged for ultimate sale to the consumer in wax-lined aluminum tubes. The pH stabilizes to 7.1 ± 0.3 after several days.

The product is used to mend a hard phenolic plastic laminate to a plywood counter top using the following procedure: The surfaces of the counter and plastic must be clean dry, free from oil, wax, paint, varnish or other finish. The adhesive is then spread evenly on both surfaces. The adhesive is applied in one direction only and the coat should be smooth. The cement is dry when its appearance has changed from milky white to clear which takes from about 15 to 40 minutes depending upon the temperature, humidity and porosity of the surface. As soon as the surfaces of the cement have turned clear, the two surfaces should be joined. The two surfaces should be perfectly aligned before actually bringing them together. An easy way to provide the perfect alignment is to keep a sheet of strong heavy paper between the two surfaces until the alignment is perfect. The sheet is then removed and pressure is applied to the entire surface by tapping with a hard rubber mallet or using a block of soft wood with a hammer. If a paper sheet is used for alignment, extra care must be exercised to make certain that both surfaces are completely dry and tack-free before inserting the paper. This procedure is usually necessary only when large surface areas are involved.

The bond formed, adhering the surfaces is strong.

EXAMPLE II

To a stainless steel reactor with agitation is added 454.7 parts of water, 8.9 parts of Triton X-165, and 8.9 parts of Triton X-305. The mixture is then heated to 55° C. and held at that temperature for 30 minutes. An additional 227.4 parts of water is then added and the mixture is cooled to 35° C.

An acrylate monomer mixture is made up by mixing 850 parts of butylacrylate; 20.0 parts of acrylonitrile; 5.9 parts of methylacrylic acid; 26.8 parts of Triton X-165; and 26.8 parts of Triton X-305. A second monomer feed containing 19.8 parts of N-methylolacrylamide and 57.4 parts of water is also prepared. A sodium bisulfite solution is also prepared by mixing 5.5 parts of sodium bisulfite and 49.9 parts of water. This is to be used as part of a redox catalyst. The other part of the redox catalyst is made by dissolving 4.2 parts of ammonium persulfate in 103 parts of water. The stainless steel clean tank is subjected to a nitrogen purge with the batch held at 34° C. To the stainless steel tank is then charged 11.1 parts of the sodium bisulfite solution and 21.4 parts of the ammonium presulfate solution. The purge is stopped and the stainless steel tank in then blanketed with nitrogen. A small portion 87.7 parts of the acrylate monomer mixture is added to the stainless steel tank. Then the acrylate monomer, the N-methylolacrylamide solution, and the sodium bisulfite solution are fed to the tank at a uniform rate over a threehour period with the exception that the N-methylolacrylamide feed is delayed for 10 minutes after the monomer feed is finished.

The product is an aqueous dispersion containing 47% solids of a binder polymer within the scope of Formula I. The binder polymer contains units derived from butylacrylate, acrylonitrile, methacrylic acid and N-methylolacrylamide.

A contact adhesive is made from the dispersion of the binder polymer by the following procedures. To a stainless tank with agitator in operation is added 94.12 parts of the above dispersion; 0.97 parts of Acrysol ASE-60, 3.25 parts of Nopco 2271; and 0.49 parts of Triton X-405. After the addition of the ingredients, the mixture is agitated for an additional 20 minutes then 0.10 parts of 26 Be' ammonium hydroxide is added to achieve a pH of 8.2 to 8.5. The agitation is continued for 20 minutes. The pH is then rechecked and adjusted to a pH of 8.2 to 8.5 if necessary; then 0.97 parts of propylene glycol is then added slowly with agitation then the agitation is continued for 15 minutes. The Brookfield viscosity using a number 4 spindle at 60 rpm and 25° C. should be 2,000 to 2,500 cps. If the viscosity is too high, water should be added. The pH should be 8.2 to 8.5 and the product should contain 50±1.5% solids. The product is filtered through a 100 mesh stainless steel screen into polyethylene lined drums. The product is packaged for ultimate sale to the consumer in wax-lined aluminum tubes.

The product is used to mend a styrofoam plastic sheet to a plywood substrate using the procedure set forth in Example I.

EXAMPLE III

To a stainless steel reactor was added 94.12 parts of Hycar 2600×120; 0.97 parts of Acrysol ASE-60; 3.25 parts of Nopco 2271; and 0.49 parts of Triton X-405. Hycar 2600×120 is available from B.F. Goodrich Chemical. It is an aqueous dispersion copolymer containing, based on copolymer weight 8% acrylonitrile, 91.5% ethylacrylate, 0.75% N-methylolacrylamide and 0.75% acrylic acid. The copolymer has a glass transistion temperature of −1° C. The emulsion contains 50% solids. About 1% of the emulsion is a surfactant at least part of which is of the anionic type. Other properties of the emulsion include:

```
pH — 3.5
surface tension — 48 dynes/cm
LVF Brookfield viscosity
  60 RPM No. 2 spindle 25° C — 100 cps
specific gravity latex — 1.07 gms/cc
latex density — 8.9 #/gal
solids density — 4.4 #/gal
T_g C. = −11° C
Shore A Hardness — 45
Particle size (A°) — 3000
```

Stress-strain data on unsupported films of Hycar 2600×120: R.T. films:

| Ultimate tensile strength (psi) | 1074 |
|---|---|
| Ultimate elongation (%) | 795 |
| Modulus at 100% elongation (psi) | 168 |
| Modulus at 300% elongation | 293 |
| Modulus at 500% elongation | 441 |

Films cured 10 minutes at 150° F.:

| Ultimate tensile strength (psi) | 970 |
|---|---|
| Ultimate elongation (%) | 813 |
| Modulus at 100% elongation (psi) | 182 |
| Modulus at 300% elongation | 302 |
| Modulus at 500% elongation | 449 |

Films cured 10 minutes at 225° F:

| Ultimate tensile strength (psi) | 752 |
|---|---|
| Ultimate elongation (%) | 687 |
| Modulus at 100% elongation (psi) | 194 |
| Modulus at 300% elongation | 395 |
| Modulus at 500% elongation | 519 |

Films cured 10 minutes at 300° F:

| Ultimate tensile strength (psi) | 752 |
|---|---|
| Ultimate elongation (%) | 417 |
| Modulus at 100% elongation (psi) | 333 |
| Modulus at 300% elongation | 636 |

Chemical resistance of Hycar 2600×120 films cured at 300° F. % increase after 10 minutes immersion:

| Perchloroethylene | 88 |
|---|---|
| 10% Sulfuric acid | 5 |
| 10% Sodium hydroxide | 9 |
| Benzene | 280 |
| ASTM Fuel A | 7.1 |
| ASTM Fuel B | 23 |
| Acetone | 304 |
| Ethyl acetate | 312 |
| Methanol | 109 |
| Water | 7.6 |
| ASTM Oil #1 | 3 |
| ASTM Oil #3 | 8 |

The mixture was agitated for 20 minutes, then 0.10 parts of ammonium hydroxide was added with continued mixing resulting in the pH rising to 8.3 and the mixture thickening. To the thickened mixture was then added 0.97 parts of propylene glycol.

The product has a viscosity of 2,300 cps using a number 4 spindle at 60 rpm. The product was packaged in wax-lined aluminum tubes. The product was tested according to the procedure set forth in Example I with excellent results.

What is claimed is:

1. An aqueous contact adhesive dispersion composition having pH of 3 to 10 which, on drying at room temperature, remains tacky to itself but otherwise becomes non-tacky, comprising, on 100 parts by weight basis, 25 to 75 parts of water having dispersed therein:
   A. 25 to 70 parts of a water insoluble binder polymer with a Tg between about −20° C and +15° C which is a reaction product of (a), (b), (c) and (d), as defined below:
      a. 50 to 99% by weight of the polymer, of an acrylate monomer or a mixture thereof having the following structural formula:

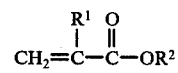

wherein R¹ is selected from H and a lower alkyl group of 1 to 4 carbon atoms and R² is selected from alkyl groups of 1 to 8 carbon atoms;
      b. 0.1 to 10% by weight of the polymer, of N-methylol acrylamide or N-methylol methacrylamide;
      c. 0.1 to 25% by weight of the polymer, of acrylic acid or methacrylic acid;
      d. 2 to 40% by weight of the polymer, of acrylonitrile or methacrylonitrile;
   B. an effective amount and up to 3 parts by weight of the composition, of an alkali metal or ammonium salt of a polyacrylic acid to thicken the composition; and
   C. an effective amount but not exceeding about 3 parts by weight of the composition, of a surface active agent to impart freeze-thaw stability to the composition.

2. The composition of claim 1 wherein amount of the acrylate monomer is 70 to 95%, amount of the acrylamide is 0.5 to 3%, amount of the acid is 0.2 to 1.0% and amount of the nitrile is 3 to 20%.

3. Composition of claim 2 which includes from 0.5 to 5 parts of a rosin ester tackifying resin.

4. Composition of claim 3 which includes a small but effective amount to depress the freezing point of the composition and up to 3 parts of a freezing point depressor.

5. Composition of claim 1 wherein the binder polymer is present at a level of from 40 to 60 parts, the salt of the polyacrylic acid is present in amount of 0.10 to 1.00 parts and contains a salt of a polymer containing from 30 to 90% by weight of the acrylic acid units and the surface active agent is present at a level of from 0.1 to 2.0 parts.

6. An article of manufacture comprising substrate having at least one surface thereof adhesively secured to at least one other surface with the composition of claim 2.

7. Method of adhering two surfaces together which comprises applying to each surface the composition of claim 2, drying the composition at room temperature until it becomes clear and non-tacky to paper but remains tacky to itself, and pressing the two surfaces together.

8. Method of adhering two surfaces together which comprises applying to each surface the composition of claim 3, drying the composition at room temperature until it becomes clear and non-tacky to paper but remains tacky to itself, and pressing the two surfaces together.

* * * * *

UNITED STATES PATENT OFFICE
CERTIFICATE OF CORRECTION

Patent No. 4,057,527　　　　　　　　　　Dated November 8, 1977

Inventor(s)　PETER SPIROS COLUMBUS

It is certified that error appears in the above-identified patent and that said Letters Patent are hereby corrected as shown below:

Col. 2, line 22,　　after "is" insert --as--;
　　　　line 51,　　after "groups" insert --or--;

Col. 4, line 27,　　after "thereof" insert --with--;
　　　　line 40,　　change "mate" to --male--;

Col. 9, lines 30,31,32,33, change "$\delta$" to --$\gamma$--;

Col. 13, line 7,　　change "1°C." to --11°C.--.

Signed and Sealed this

Eleventh Day of April 1978

[SEAL]

Attest:

RUTH C. MASON
Attesting Officer

LUTRELLE F. PARKER
Acting Commissioner of Patents and Trademarks